United States Patent [19]

Blackburn

[11] Patent Number: 4,979,763
[45] Date of Patent: Dec. 25, 1990

[54] METHOD AND APPARATUS FOR SENSING A VEHICLE CRASH

[75] Inventor: Brian K. Blackburn, Rochester Hills, Mich.

[73] Assignee: TRW Vehicle Safety Systems Inc., Lyndhurst, Ohio

[21] Appl. No.: 358,875

[22] Filed: May 30, 1989

[51] Int. Cl.$^5$ ............................................. B60R 21/32
[52] U.S. Cl. ..................................... 280/735; 180/282
[58] Field of Search ................ 280/735, 734; 180/274, 180/271, 282; 307/10.1

[56] References Cited

U.S. PATENT DOCUMENTS

| | | | |
|---|---|---|---|
| 3,703,300 | 11/1972 | Gillund et al. | 180/91 |
| 3,870,894 | 3/1975 | Brede et al. | 307/9 |
| 3,911,391 | 10/1975 | Held et al. | 180/103 |
| 4,020,453 | 4/1977 | Spies et al. | 180/91 |
| 4,166,641 | 9/1979 | Okada et al. | 280/735 |
| 4,410,875 | 10/1983 | Spies et al. | 180/274 |
| 4,487,025 | 1/1985 | Hannoyer | 364/424 |
| 4,638,179 | 1/1987 | Mattes et al. | 280/735 |
| 4,804,859 | 2/1989 | Swart | 280/735 |
| 4,842,301 | 6/1989 | Feldmaier | 280/735 |
| 4,851,705 | 7/1989 | Musser et al. | 280/735 |
| 4,873,452 | 10/1989 | Morota et al. | 280/735 |
| 4,896,898 | 1/1990 | Lenzen et al. | 280/735 |

OTHER PUBLICATIONS

Specification Sheet for LT 1088, Linear Technology Corp.
Application Note 22, Linear Technology Corp.
RMS to DC Conversion Appln. Guide Analog Devices, pp. 1–11.
Specification Sheet for Accelerometer Model 3021 IC-Sensors.
Miniature Silicon Accelerometer With Built-In Damping by Stephen Terry.

Primary Examiner—Richard A. Bertsch
Attorney, Agent, or Firm—Tarolli, Sundheim & Covell

[57] ABSTRACT

A method and apparatus is disclosed for controlling actuation of an air bag restraint system. A deceleration sensor provides a signal having an RMS value which is functionally related to the value of the vehicle deceleration. An RMS thermal converter converts the deceleration signal into a converted voltage value. The converted voltage value is compared against a predetermined value, the predetermined value being indicative of a maximum deceleration value. If the converted voltage value of the deceleration signal exceeds the predetermined value, the air bag is actuated. A forced feedback arrangement uses a differential amplifier and a second, similar thermal sensor arrangement in a balance circuit so as to eliminate common-mode voltage errors. The feedback arrangement retains the converted value of the deceleration signal for a predetermined time period after the deceleration signal decays.

15 Claims, 3 Drawing Sheets

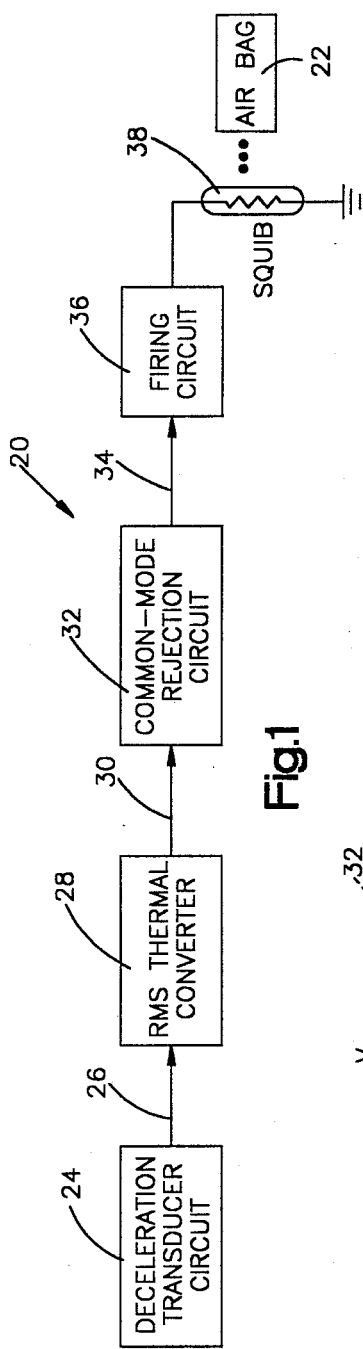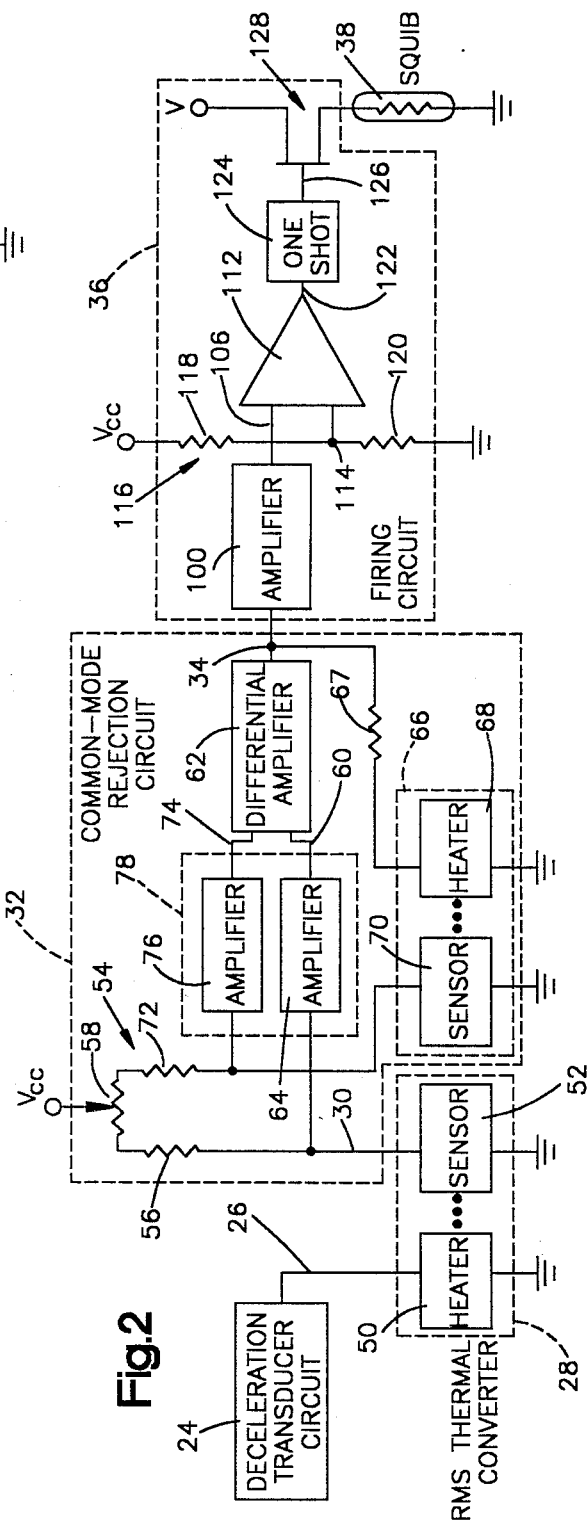

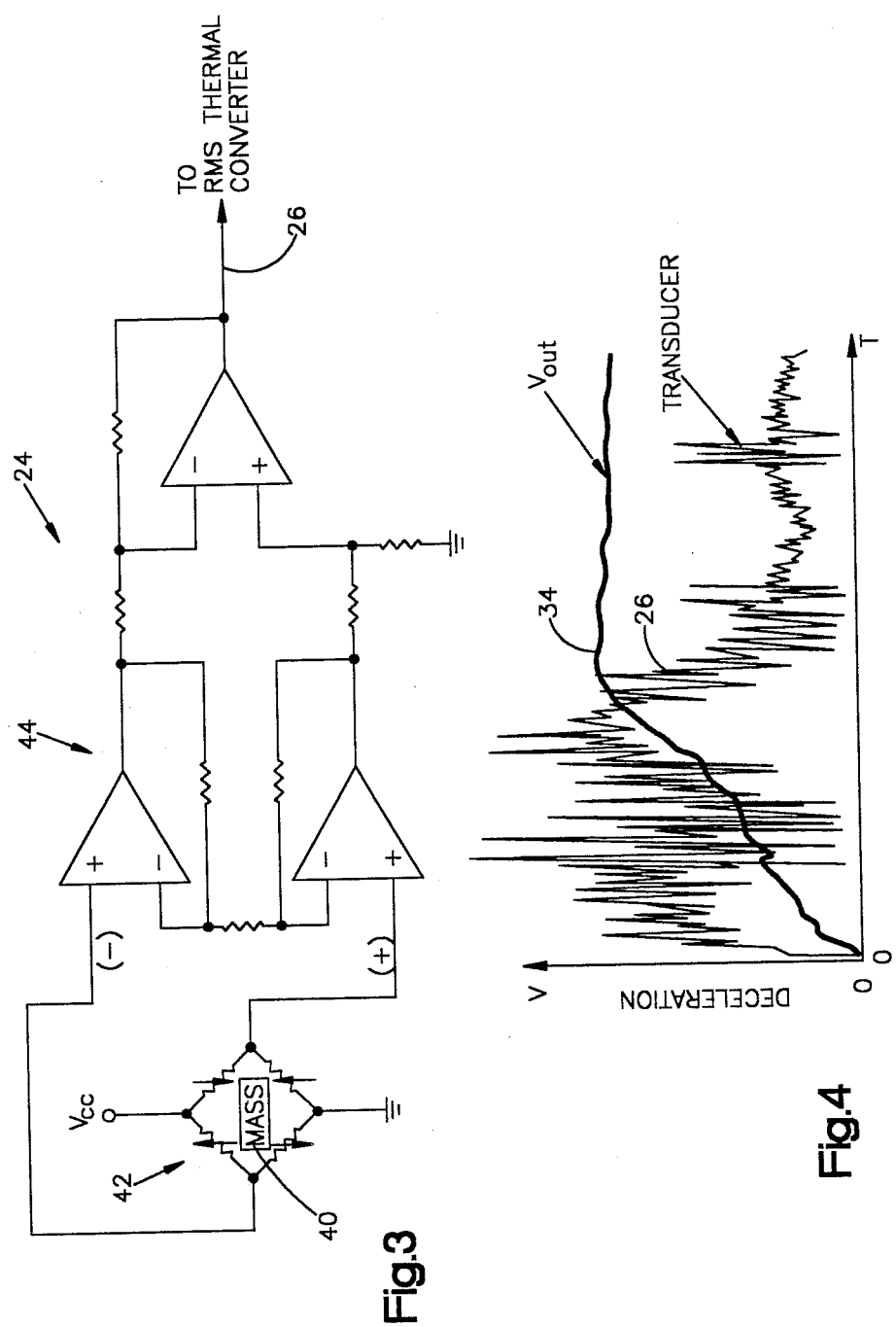

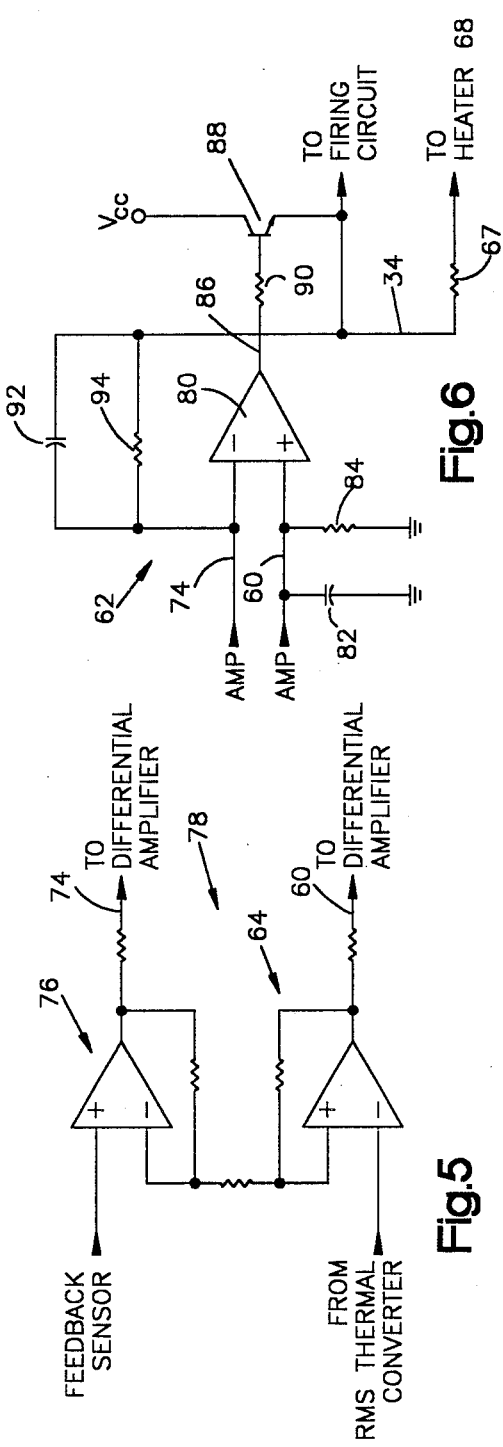
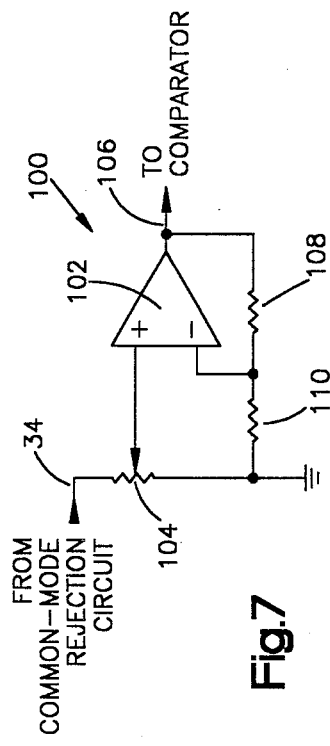
Fig.5
Fig.6
Fig.7

METHOD AND APPARATUS FOR SENSING A VEHICLE CRASH

TECHNICAL FIELD

The present invention is directed to an actuatable passenger restraint system for a vehicle and is particularly directed to a method and apparatus for sensing deceleration of the vehicle and for providing a signal upon such occurrence to actuate a passenger restraint air bag.

BACKGROUND

Actuatable passenger restraint systems for vehicles are well known in the art. Such systems include an inflatable air bag mounted within the passenger compartment of the vehicle Each air bag in the vehicle has an associated, electrically actuatable ignitor, referred to as a squib. Such systems further include an inertia sensing device for measuring the deceleration of the vehicle When the inertia sensing device indicates that the vehicle is decelerating a certain amount, an electric current of sufficient magnitude and duration is passed through the squib to ignite the squib which results in inflation of the air bag.

Many known inertia sensing devices used in actuatable passenger restraint systems are mechanical in nature Such devices are typically mounted to the vehicle frame and include a pair of mechanically actuatable switch contacts and a resiliently biased weight The weight is arranged such that when the vehicle is decelerated, the weight physically moves relative to its mounting The greater the deceleration, the more the weight moves against the bias force. The switch contacts are mounted relative to the biased weight such that, when the weight moves a predetermined distance, the weight moves over the switch contacts causing them to close. The switch contacts, when closed, connect a squib to a source of electrical energy sufficient to ignite the squib.

Still other known actuatable passenger restraint systems for vehicles include an electrical transducer or accelerometer for sensing vehicle deceleration. Such systems include a monitoring or evaluation circuit connected to the output of the transducer. The monitoring circuit, upon determining the signal from the transducer indicates a probable crash is occurring, actuates an electrical switch so as to connect electrical energy to the squib. U.S. Pat. No. 3,870,894 to Brede, et al., ("the '894 patent") discloses such an actuatable passenger restraint system.

The '894 patent teaches a system which includes an accelerometer, an evaluation circuit connected to the accelerometer, and an ignition circuit or squib connected to an output of the evaluation circuit. The accelerometer includes a piezoelectric transducer that provides an electrical output signal having a value indicative of the vehicle deceleration. The evaluation circuit includes an integrator electrically coupled to the output of the accelerometer through an amplifier. The output of the integrator is an electrical signal having a value which is functionally related to the integral of the deceleration signal. When the output of the integrator reaches a predetermined value, the ignition circuit of the air bag is fired.

The integrator used in the '894 patent is a common resistor/capacitor configuration known in the art. The output of the integrator ramps up from electrical ground toward the supply voltage at a rate that is functionally related to the value of the input signal. A trigger circuit is connected to the output of the integrator. When the output of the integrator reaches a predetermined value, the trigger circuit actuates a time delay circuit. The time delay circuit begins to time out a predetermined time period. After the time period is timed out, the air bag ignitor is energized.

The integrator in the '894 patent, in combination with the trigger circuit, provides an indication of the change in velocity of the vehicle. The faster the vehicle deceleration, the faster the trigger circuit will provide the signal to initiate the timing out of the time delay circuit. Therefore, when the vehicle's deceleration is sufficient to result in the accelerometer transducer providing an electrical signal, and when the change in vehicle speed exceeds the predetermined value set by the integrator/trigger circuit combination, the air bag is inflated.

It has been discovered that it is not desirable to inflate the vehicle air bag under all types of rapid decelerations or crashes to which the vehicle is subjected. It is not desirable, for example, to inflate the air bag during a low speed, "soft crash." The determination as to what occurrences fall within the definition of "soft crash" is dependent upon various factors related to the type of vehicle. If, for example, a large vehicle traveling eight miles per hour hits a parked vehicle, such a crash would be considered a "soft crash" that would not require the air bag to inflate to protect the vehicle passengers. The vehicle seat belts alone would be sufficient to provide passenger safety. During such a "soft crash," a typical accelerometer would provide an output signal indicating a rapid deceleration is occurring. In an actuatable passenger restraint system made in accordance with the '894 patent, the air bag would be inflated as soon as the predetermined speed differential occurred and the time delay circuit timed out.

It is desirable to have an actuatable restraint system that can distinguish a "hard crash" from a "soft crash" based upon the accelerometer output signal, and in response thereto, only inflate the air bag when actually needed to protect the passengers in the vehicle.

SUMMARY OF THE PRESENT INVENTION

The present invention provides a new and improved method and apparatus for electrically controlling an actuatable passenger restraint system which inflates the system's air bag only upon the occurrence of a crash of sufficient magnitude that requires the use of the air bag for protection of the passengers in the vehicle.

In accordance with the present invention, an apparatus is provided for controlling actuation of a vehicle air bag restraint system. The apparatus comprises accelerometer means for sensing vehicle deceleration and for providing an electric signal having a value functionally related to the sensed deceleration. Means are provided for converting the signal provided by the accelerometer into its root mean square ("RMS") value. Means are provided for comparing the value of the converted signal against a predetermined value, the predetermined value being indicative of a vehicle deceleration of a predetermined magnitude. The apparatus of the present invention further includes means for actuating the air bag restraint system when the comparing means indicates the vehicle is being decelerated at a value greater than the value represented by the predetermined value.

In accordance with the present invention, a method for controlling actuation of a vehicle air bag restraint system is provided comprising the steps of sensing vehicle deceleration and providing an electric signal having a value that is functionally related to the sensed deceleration, converting the electric signal provided that is indicative of the sensed vehicle deceleration into an RMS value, comparing the value of the converted signal against a predetermined value, said predetermined value being indicative of a deceleration of a predetermined magnitude, and actuating the air bag restraint system when said step of comparing indicates that the vehicle deceleration is greater than the deceleration value represented by the predetermined value.

In accordance with a preferred embodiment of the present invention, an apparatus is provided for controlling actuation of a vehicle air bag restraint system. The apparatus comprises accelerometer means for sensing vehicle deceleration and for providing an electric signal having a value that is functionally related to the sensed vehicle deceleration. Means are provided for converting the value of the electric signal provided by the accelerometer means into an electric signal having a value functionally related to the RMS value of the electric signal from the accelerometer means. Means are provided for comparing the value of the converted signal provided by the converting means against a predetermined value, the predetermined value being indicative of a vehicle deceleration of a predetermined magnitude. Means are provided for actuating the air bag restraint system when the comparing means indicates the vehicle deceleration is greater than the predetermined value.

The converting means, in accordance with the preferred embodiment, includes first heater means connected to the signal provided by the accelerometer means. The first heater means radiates heat with a value functionally related to the value of the electric signal from the accelerometer means. The converting means further includes first temperature sensor means having a resistive value that is functionally related to the sensed temperature of the first heater means. The first temperature sensor means is connected to a resistive voltage dividing network so as to provide a voltage having a value that varies as a function of the temperature sensed by the first sensing means. The voltage value across the first temperature sensor is a value that is functionally related to the RMS value of the signal from the accelerometer means.

The apparatus in accordance with the preferred embodiment further includes a common-mode rejection means operatively connected to the converting means so as to eliminate common-mode rejection errors from the signal provided by the converter prior to providing the converter signal to the comparing means. The common-mode rejection means includes a differential amplifier, a first amplifier connected to the first sensor means and to one input of the differential amplifier through a first low pass filter, and second heater means connected to the output of the differential amplifier for radiating heat with a value functionally related to the value of the electric signal outputted from the differential amplifier. A second low pass filter is connected to the output of the differential amplifier. The common-mode rejection means also includes a second heat sensor associated with the second heater means and a second amplifier connected to the second heat sensor and to a second input of the differential amplifier. The second heat sensor has a resistive value that is functionally related to the amount of heat provided by the second heater means. The second heat sensor is also connected to a second voltage dividing network for providing the differential amplifier with a voltage value which is functionally related to the value of the output of the differential amplifier. The output of the differential amplifier is the RMS value of the signal provided by the accelerometer means without a common-mode error component being present.

The comparing means of the preferred embodiment includes a variable gain amplifier for controlling the converter loop gain. The output of the variable gain amplifier is connected to one input of a comparator. A voltage dividing network is connected to the other input of the comparator and provides a voltage value against which the converted RMS value of the output signal of the accelerometer means is compared. The actuating means includes one-shot means connected to the output of the comparator for providing a pulse signal of predetermined duration upon the occurrence of an accelerometer signal having an RMS value greater than a predetermined value. The actuating means further includes electronic switch means operatively connected between a source of electrical energy and an ignitor of the air bag restraint system and controlled by the output of the comparator so as to provide the ignitor with sufficient electrical energy to actuate the ignitor upon the output of the accelerometer indicating a crash of a predetermined magnitude is occurring.

BRIEF DESCRIPTION OF THE DRAWINGS:

Other features and advantages of the present invention will become apparent to those skilled in the art to which the present invention relates from a reading of the following detailed description of a preferred embodiment with reference to the accompanying drawings, in which:

FIG. 1 is a schematic block diagram of control arrangement made in accordance with the present invention;

FIG. 2 is a schematic diagram of the control arrangement shown in FIG. 1 in more detail;

FIG. 3 is a schematic diagram of the deceleration transducer circuit shown in FIG. 1;

FIG. 4 is a graphical representation of certain voltage values present in the control arrangement shown in FIG. 1;

FIG. 5 is a schematic diagram of a portion of the common-mode rejection circuit shown in FIG. 1;

FIG. 6 is a schematic diagram of a portion of the common-mode circuit shown in FIG. 1; and FIG. 7 is a schematic diagram of a portion of the firing circuit shown in FIG. 1.

DETAILED DESCRIPTION OF THE PREFERRED EMBODIMENT

Referring to FIG. 1, an apparatus 20 is shown for controlling actuation of an air bag 22 in an actuatable passenger restraint system of a vehicle. The apparatus 20 includes a deceleration transducer circuit 24 that provides an output signal 26 having a value indicative of the deceleration of the vehicle. The output 26 of the transducer is connected to an RMS thermal converter 28. The RMS thermal converter 28 provides an output signal 30 having an RMS value functionally related to the value of the signal 26.

The output signal 30 is connected to a common-mode rejection circuit 32. The common-mode rejection circuit 32 monitors the output signal 30 from the RMS thermal converter 28 and provides an output signal 34 having a converted RMS value which is functionally related to the value of the output signal 26 of the transducer 24 without variance due to common-mode voltage errors. The output 34 is connected to a firing circuit 36. The firing circuit 36 controls the gain of the converter circuit, including the RMS thermal converter and the common-mode rejection circuit, and compares the converted RMS value against a predetermined value.

The predetermined value is indicative of a maximum deceleration value, above which it is necessary to fire or actuate the air bag for protection of the vehicle occupants. The firing circuit 36 is connected to a squib 38 associated with the air bag 22. When the firing circuit 36 is to fire the squib 38, the squib 38 is connected to a source of electrical energy so as to provide the squib with a predetermined minimum electrical current for a predetermined minimum time period so as to insure proper operation of the squib.

Referring to FIG. 3, the deceleration transducer circuit 24 includes a mass 40 suspended by a cantilever support arrangement (not shown). Four variable resistors 42, such as piezo-resistors, are mounted to the cantilever support arrangement. The resistors 40 are electrically connected in a Wheatstone bridge configuration. When the mass 40 of the accelerometer moves relative to its mounting, as would occur when the vehicle suddenly decelerates, the resistances of the resistors 42 change and thereby provide an indication of the value of the vehicle deceleration. Such a transducer or accelerometer is available commercially from ICSensors, 1701 McCarthy Blvd., Milpitas, Calif. 95035 under Model No. 3021.

The bridge resistors 42 are connected to an amplifier circuit 44 which provides the output signal 26 having a value indicative of the deceleration value of the vehicle. FIG. 4 shows a graph of the transducer output signal 26 during a vehicle deceleration. The rough appearance to the graph of the output signal 26 is due to the vibrations of the mass 40 during the vehicle deceleration.

The output signal 26 is connected to the RMS thermal converter 28, as shown in FIG. 2. The RMS thermal converter 28 includes a heater element 50 connected to the output signal 26 of the transducer 24 and to electrical ground. The heater element 50, which may be a resistor, provides heat when electrical current is passed through it. As is well known in the art, when an electric signal is passed through a load, the heat generated in the load is functionally related to the RMS value of the signal. Therefore, the temperature of the heater element 50 is functionally related to the RMS value of the output signal 26. A straight forward way to convert the value of the signal 26 into an RMS value is to measure the temperature of the heater element 50. Such a process is known in the art as thermal RMS conversion.

The converter 28 further includes a temperature sensor 52 associated with and in thermal communication with the heater element 50. The sensor 52 has a resistance value that varies as a function of its temperature. Therefore, as the temperature of the heater element 50 varies, the resistance value of the sensor 52 varies.

The sensor 52 is connected to electrical ground and to a resistor balance circuit 54 which includes a resistor 56 connected to a reference voltage Vcc through a potentiometer 58. The junction between resistor 56 and sensor 52 is connected to one input 60 of a differential amplifier 62 through an amplifier 64. The output 34 of the differential amplifier 62 is connected to a thermal heater/sensor arrangement 66 through a series resistor 67. The heater/sensor arrangement is preferably identical in structure and operation as the RMS thermal converter 28.

In particular, the output 34 of the differential amplifier 62 is connected to a heater element 68 through the series resistor 67. The heater element 68 is also connected to electrical ground. A sensor 70, associated with and thermally coupled to the heater element 68, is connected to electrical ground and to the reference voltage Vcc through a resistor 72 and potentiometer 58. The junction of resistor 72 and sensor 70 is operatively connected to a second input 74 of differential amplifier 62 through an amplifier 76.

As represented in FIG. 5, the amplifiers 64, 76 form an instrumentation amplifier 78 that amplifies the voltage difference present across sensor 52 and sensor 70. The differential amplifier 62, as shown in FIG. 6, includes an operational amplifier ("op amp") 80 having a non-inverting input 60 and an inverting input 74. The output of amplifier 64 is connected to the non-inverting input 60. The output of amplifier 76 is connected to the inverting input 74. A capacitor 82 and a resistor 84 are connected between the non-inverting input 60 of the op amp 80 and electrical ground so as to provide a low pass filter.

The output 86 of the op amp 80 is connected to the base of a NPN transistor 88 through a resistor 90. The collector of the transistor 88 is connected to a reference voltage Vcc. The emitter of transistor 88 is connected to the firing circuit 36 and connected to the heater 68 through the series resistor 67 of the thermal sensor arrangement 66. The emitter of transistor 88 is further connected back to the inverting input 74 through the parallel combination of capacitor 92 and resistor 94. The capacitor 92 and the resistor 94 function as a low pass filter. This arrangement provides a source of current for the heater 68.

The output 34 of the differential amplifier 62 is connected to an amplifier 100 of the firing circuit 36, as shown in FIG. 2. The amplifier 100, as shown in FIG. 7, includes an operational amplifier 102 having its non-inverting input connected to the output 34 of the differential amplifier 62 through a potentiometer 104. The output 106 of the op amp 102 is fed back to its inverting input through a resistor network including resistors 108, 110. The amplifier 100 is used to control the loop gain of the RMS thermal converter. Preferably, potentiometer 104 is adjusted so that the gain of the signal processing circuitry, including the RMS thermal converter 28, the common-mode rejection circuit 32, and the amplifier 100, is equal to one.

The output 106 of the op amp 102 is connected to one input of a comparator 112. The other input of the comparator 112 is connected to a predetermined reference voltage 114 which is derived from the reference voltage Vcc through the resistor divider network 116. The predetermined reference voltage is established through a resistor dividing network connected between the reference voltage Vcc and electrical ground. The network 116 includes resistors 118, 120. The output 122 of the comparator 112 is connected to an edge triggered one-shot 124. The one-shot can be selected to trigger off the rising edge or the falling edge of the output signal 122.

Whether the one-shot 124 is triggered off the rising or falling edge will determine the connections at the two inputs of the comparator 112. For example, if the one-shot 124 is a rising edge trigger type, the output 106 of the amplifier 100 would be connected to non-inverting input of the comparator 112 and the reference voltage 114 would be connected to the inverting input.

The output 126 of the one-shot 124 is connected to a control input of an electrically controlled switch 128 which can be one of several type of switches commercially available. One terminal of the switch 128 is connected to a supply voltage V and the other terminal of the switch is connected to the squib 38. The other terminal of the squib is connected to electrical ground. The one-shot is arranged such that when triggered, it actuates the switch 128 for a sufficient time duration so as to insure that the squib has fired. The voltage source V must be of sufficient magnitude to supply sufficient electrical current to the squib when the switch 128 is actuated to insure that the squib fires.

In operation, the accelerometer monitors the vehicle deceleration. When the vehicle is subject to a large deceleration, such as three times the force of gravity or greater, the deceleration transducer circuit 24 provides an electric signal having a value functionally related to the deceleration value. Referring to FIG. 4, a graphical representation of an output of the deceleration transducer circuit during a large deceleration is depicted. The output 26 causes the heater element 50 to heat. The temperature of the heater element 50 is functionally related to the RMS value of the output 26. The sensor 52 monitors the temperature of the heater element 50, its resistance changing as a function of the amount of heat sensed, and, in turn, the RMS value of the of the output signal 26.

When the resistance of the sensor 52 first changes, an imbalance is created in the circuit 54 which includes resistors 56, 58, 72, and sensors 52, 70. The imbalance in the circuit 54 results in the differential amplifier 62 increasing its output voltage. As the output 34 of the differential amplifier 62 increases, the heater element 68 provides an increased heat output which is sensed by its associated sensor 70. Once the heater element 68 provides a sufficient amount of heat to cause the voltage drop across the sensor 70 to equal the voltage drop across the sensor 52, the output of the differential amplifier 62 will hold at the then present value.

Referring to FIG. 4, the output 34 of the differential amplifier 62 is shown responsive to a deceleration signal 26. The output 34 is functionally related to the value of the RMS component of the input signal 26. The output 34 has a finite phase lag relative to the rising edge of the input signal. This phase lag is due to the response time of the differential amplifier 62 and to the reaction time of heater/sensor combination 68, 70. A heater/sensor combination such as 68, 70 has a fixed reaction time, i.e. that time delay from when heat is provided by the heater element to when that provided heat is sensed by the sensor. This fixed time delay is referred to as the heater/sensor thermal time constant. Because thermal sensor arrangements are commercially available in a monolithic design or can be manufactured in a monolithic design, the thermal time constant is sufficiently small to make their use in a crash sensor possible.

The thermal sensors 28 and 66 preferably include the same type of components. It should be appreciated that ambient temperature variations on the thermal sensor 28 which may induce a common-mode voltage error will equally affect the thermal sensor 66. The feedback arrangement as shown and described cancels the effects of ambient temperature variations. Also, the potentiometer 58 permits an initial zero balancing of the circuit so as to adjust for component variances prior to use.

The output 34 of the differential amplifier 62 is monitored by the firing circuit 36. The predetermined reference voltage 114 controls when the squib will be fired and when, in turn, the air bag 22 will be actuated. When the RMS value of the deceleration signal reaches a predetermined level, which is functionally related to the value of the predetermined reference voltage 114, the air bag 22 is actuated. The RMS value being at a certain level is indicative of a certain value of deceleration.

The apparatus 20 made in accordance with the present invention permits the distinction between a vehicle "soft crash" and a "hard crash" to better control the actuation of the air bag. During a "soft crash" of the vehicle, the deceleration value is lower than during a "hard crash." By properly selecting the reference voltage 114 taking into account many of the vehicle parameters, one can control when the air bag will be actuated so as to protect the vehicle occupants better and not to actuate the air bag needlessly for "soft crashes" or inflate the air bag sooner than it should be inflated. When a "hard crash" occurs, the air bag will be actuated within a very short time period. The only time delay encountered results from the system phase lag. If the vehicle is slowly decelerating at a value that would be considered a "soft crash" but then increases its deceleration value to that of a "hard crash," the air bag will not be actuated during the "soft crash" when it is not needed but will be actuated when the "hard crash" criteria is reached.

Also, the thermal sensor arrangement, because of its inherent thermal lag or thermal time constant, acts to filter out certain occurrences for which it is not desirable to actuate the air bag. For example, if the vehicle was subject to a high frequency hammer blow, heat would be generated for only a short period of time which would be insufficient to raise the sensor voltage enough to result in actuation the air bag.

The apparatus 20 in accordance with the present invention further provides a short-term memory feature in which the occurrence of a deceleration large enough to produce an output signal from the transducer 24 but not large enough to result in actuation of the air bag is "remembered" so that if a second large deceleration occurs within a certain time period, the second deceleration effect is added to the first deceleration effect so as to result in a quicker actuation of the air bag. Referring to FIG. 4, the output 34 of the common-mode rejection circuit 32 increases in response to the transducer output signal 26. Once the transducer signal 26 decreases because of a decrease in the vehicle deceleration, the output 34 begins to decrease from its highest level at a relatively slow rate as compared to the decrease in the deceleration signal.

This slow decrease in the output signal 34 results from the presence of resistor 67 connected in series with the heater 68. The transistor 88 functions as a single ended current source providing power to the heater 68. The voltage remains high at output 34 with a part of the voltage drop occurring across resistor 67. The feedback arrangement is such that the power supplied to the heater 68 must equal the power supplied to the heater 50 by the transducer 24. The resistor 67 effects a positive power lag because some of the power provided by the single ended current source is effectively lost through resistor 67.

Therefore, the voltage at 34 decreases slowly until power equalization occurs, i.e., the power provided to heater 50 is equal to the power provided to heater 68. If the vehicle should be subjected to a large deceleration while the voltage 34 is still relatively high, the output 34 will begin to increase from its then present level. It should be appreciated that this increases the response time of the apparatus 20 because the output 34 "remembered" the occurrence of the previous large deceleration. If a second deceleration does not occur by the time the output drops to its zero level, the second deceleration was probably not a result of the same event as the first deceleration. Under such a condition, the second deceleration would be processed as described above.

It should be appreciated that this function of retaining the converted RMS value of the deceleration signal can also be accomplished by using heater/sensor arrangements for 28, 66 that have different thermal time constants. In particular, this function can be retained by using a heater/sensor arrangement 66 that has a longer thermal time constant than the heater/sensor arrangement 28. The effect of resistor 67 in the above-described embodiment is to increase the thermal time constant of the heater/sensor arrangement 66. The feedback arrangement balances the sensed power of the two heaters 50, 68. If the thermal time constant of the heater/sensor 66 is longer than that of the heater/sensor 28, the output of 34 will be begin to decay at a relatively slow rate from highest converted value. The decay time is controlled by the amount of time needed for the power to balance.

The thermal sensor arrangements 28, 66 can be made with discrete components or can be manufactured on a single integrated circuit package. There is at least one commercially available thermal sensor arrangement manufactured by Linear Technology Corporation of 1630 McCarthy Blvd., Milpitas, Calif. 95035-7487 under part No. LT1088.

This invention has been described with reference to preferred embodiments. Modifications and alterations may occur to others upon reading and understanding this specification. For example, the present invention has been described with reference to an RMS thermal converter that uses a thermal sensor conversion technique. It should be appreciated that other RMS conversion devices or processes are equally applicable. Other such conversion devices could include circuitry which calculates the RMS value of the deceleration signal. Such calculations can be done using direct or explicit computation techniques or can be done using indirect or implicit computation techniques. It is my intention to include all such modifications and alterations insofar as they come within the scope of the appended claims and the equivalents thereof.

Having fully described my invention, I claim:

1. An apparatus for controlling actuation of a vehicle air bag restraint system, said apparatus comprising:
   accelerometer means for sensing vehicle deceleration and for providing an electric signal having an RMS value functionally related to the sensed deceleration;
   means for converting said electric signal provided by said accelerometer means into an RMS value, said RMS value being indicative of the sensed vehicle deceleration value;
   means for comparing the converted RMS value against a predetermined value, said predetermined value being indicative of a predetermined deceleration value; and
   means for actuating the air bag restraint system when said comparing means indicates the sensed value of the vehicle deceleration is greater than the deceleration value represented by the predetermined value.

2. The apparatus of claim 1 further including means for rejecting common-mode errors from the converting means.

3. The apparatus of claim 1 wherein said converting means includes first heater means connected to the signal provided by the accelerometer means, said first heater means radiating heat with a value functionally related to the RMS value of the electric signal from the accelerometer means, first temperature sensor means having a resistive value that is functionally related to the sensed temperature of the first heater means, said first temperature sensor means connected to a resistive voltage dividing network so as to provide a voltage having a value that varies as a function of the temperature sensed by the first sensing means and, in turn, indicative of the RMS value of the electric signal provided by said accelerometer means.

4. The apparatus of claim 3 further including a common mode rejection means operatively connected to said converting means so as to eliminate common-mode rejection errors from the signal provided by said converting means.

5. The apparatus of claim 4 wherein said common-mode rejection means includes a differential amplifier, a first amplifier connected to the first sensor means and to one input of said differential amplifier, second heater means connected to the output of the differential amplifier for radiating heat therefrom with a value functionally related to the value of the electric signal from the differential amplifier, second heat sensor means associated with the second heater means, said second heat sensor means having a resistive value that is functionally related to the temperature of said second heater means, said second heat sensor means being connected to a second voltage dividing network for providing a voltage value which is functionally related to the value of the output of the differential amplifier, and a second amplifier connected to the second heat sensor means and to a second input of the differential amplifier, the output of the differential amplifier being an electric signal having a value functionally related to the RMS value of the signal provided by the accelerometer means without a common mode error component being present.

6. The apparatus of claim 5 wherein said comparing means includes a comparator, one input of the differential amplifier signal being connected to one input of the comparator, voltage dividing network connected to the other input of the comparator and providing said predetermined voltage value against which the converted value of the output signal of the accelerometer means is compared, and wherein said means for actuating includes one-shot means connected to the output of the comparator for providing a pulse signal of predetermined duration when the comparator output signal indicates that the converted output signal from the accelerometer means is greater than the predetermined voltage value, and electronic switch means operatively connected between a source of electrical energy and an ignitor for the air bag restraint system and controlled by the output of said one-shot means so as to provide the ignitor with sufficient electrical energy to actuate the ignitor when the RMS value of the output signal of the accelerometer means is greater than the predetermined voltage value.

7. The apparatus of claim 5 further including a resistor connected in series between the output of said differential amplifier and said second heater means, said resistor effecting a positive power lag between the power generated by said first heater means and said second heater means.

8. The apparatus of claim 1 wherein said converting means includes means for retaining the converted RMS value of said accelerometer at its highest converter value for a predetermined amount of time when said deceleration signal decreases.

9. The apparatus of claim 8 wherein said converting means further includes means to add the retained value of the converted RMS value to a converted value of additional occurrences of accelerometer signals indicating vehicle decelerations.

10. An apparatus for controlling actuation of a squib in a vehicle air bag restraint system, said apparatus comprising:
   accelerometer means for sensing deceleration of the vehicle and for providing an electric signal having an RMS value which is functionally related to the value of sensed deceleration;
   first heater means connected to said accelerometer means, said first heater means being energized by the electric signal from said accelerometer means and generating heat, the temperature of said first heater means being functionally related to the RMS value of the electric signal from said accelerometer means;
   first heat sensing means associated with said first heater means for providing an electric signal having a value which is functionally related to the temperature of said first heater means which, in turn, is functionally related to the RMS value of the output of the accelerometer means; and
   firing means for monitoring the electric signal from said first heat sensing means and for energizing the squib when the signal from said first sensing means indicates the deceleration of the vehicle is greater than a predetermined value.

11. The apparatus of claim 10 further including a common-mode rejection means operatively connected to said first heat sensing means for eliminating common-mode voltages from said converted signal provided by said first sensing means prior to providing said converted signal to said firing means.

12. The apparatus of claim 11 wherein said common-mode rejection means includes a differential amplifier, a first amplifier connected to the first heat sensing means and to one input of said differential amplifier, second heater means connected to the output of the differential amplifier for radiating heat, the temperature of said second heater means being functionally related to the value of the output signal from the differential amplifier, second heat sensing means associated with the second heater means, said second heat sensing means having a resistive value that is functionally related to the temperature of said second heater means, said second heat sensing means being connected to a second voltage dividing network for providing a voltage value which is functionally related to the value of the output signal from the differential amplifier, and a second amplifier connected to the second heat sensing means and to a second input of the differential amplifier, the output of the differential amplifier being an electric signal having a value functionally related to the RMS value of the signal provided by the accelerometer means without a common mode component being present.

13. The apparatus of claim 12 wherein said firing means includes a comparator, the output signal from the differential amplifier being connected to one input of the comparator, voltage dividing network connected to the other input of said comparator and providing a predetermined voltage value against which the value of the converted RMS value of the signal from said accelerometer means is compared, one-shot means connected to the output of said comparator for providing a pulse signal of predetermined duration when said comparator output signal indicates that the RMS value of the signal from said accelerometer means is greater than the predetermined voltage value, and electronic switch means operatively connected between a source of electrical energy and an ignitor for the air bag restraint system and controlled by the output of said oneshot so as to provide the ignitor with sufficient electrical energy to actuate the ignitor when the comparator output indicates that the RMS value of the accelerometer means is greater than the predetermined value.

14. A method for controlling actuation of a vehicle air bag restraint system, said method comprising the steps of:
   a) sensing vehicle deceleration;
   b) providing an electric signal having an RMS value functionally related to the sensed deceleration;
   c) converting said provided electric signal into an RMS value;
   d) comparing the converted RMS value against a predetermined value, said predetermined value being indicative of a predetermined vehicle deceleration value; and
   e) actuating the air bag restraint system when said step of comparing indicates the value of sensed vehicle deceleration is greater than the deceleration value represented by the predetermined value.

15. A method for controlling actuation of a squib in a vehicle air bag restraint system, said method comprising the steps of:
   a) sensing the amount of deceleration of the vehicle;
   b) providing an electric signal having an RMS value which is functionally related to the sensed amount of vehicle deceleration;
   c) thermally converting the electric signal indicative of the sensed deceleration into an electric signal having a converted value functionally related to the RMS value of the signal indicative of the sensed vehicle deceleration;
   d) comparing the converted value provided by the step of thermally converting against a predetermined value, said predetermined value being indicative of a predetermined maximum vehicle deceleration value; and
   e) connecting the squib to a source of electrical energy sufficient to ignite the squib when the step of comparing indicates the vehicle deceleration value is greater than the predetermined maximum value of vehicle deceleration.

* * * * *